May 6, 1930. S. WILLIAMS 1,757,762
MACHINE FOR EXTRACTING HULLS OF COTTON BOLLS FROM SEED COTTON
Filed Nov. 1, 1928
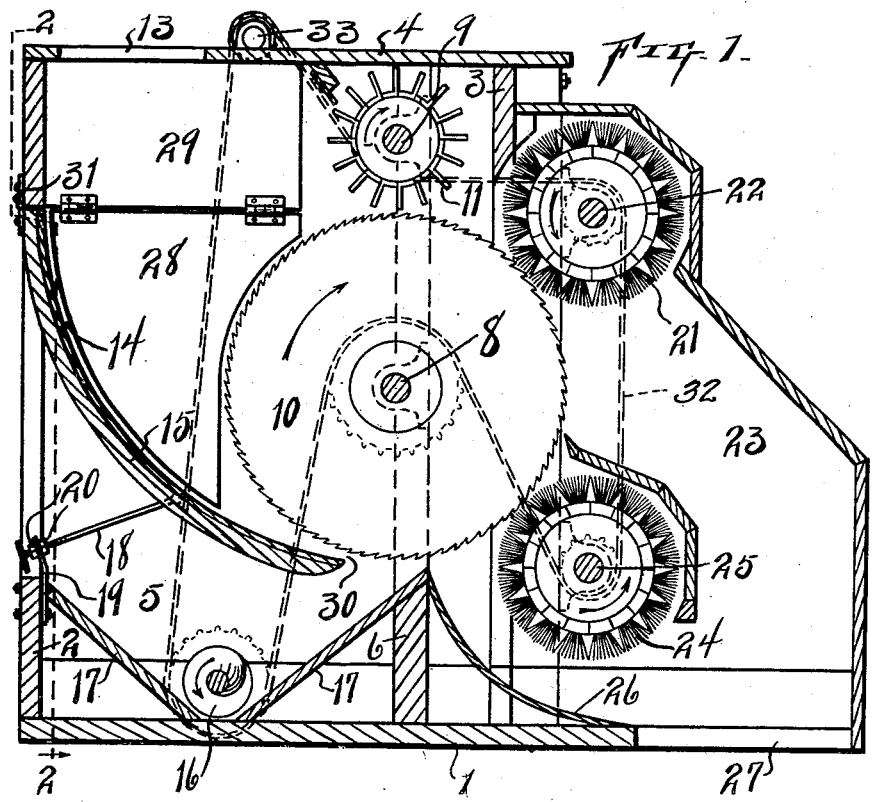
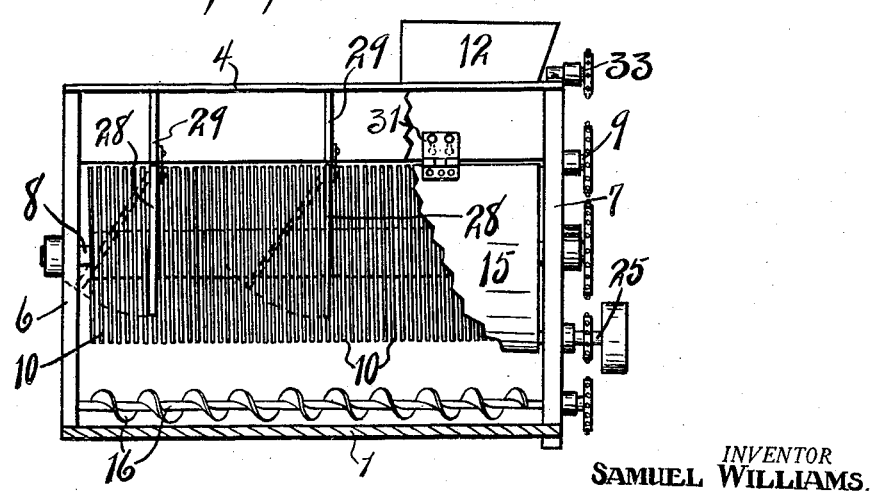
INVENTOR
SAMUEL WILLIAMS.
BY *A. D. Jackson*
ATTORNEY.

Patented May 6, 1930

1,757,762

UNITED STATES PATENT OFFICE

SAMUEL WILLIAMS, OF ELK CITY, OKLAHOMA

MACHINE FOR EXTRACTING HULLS OF COTTON BOLLS FROM SEED COTTON

Application filed November 1, 1928. Serial No. 316,598.

My invention relates to machines for extracting hulls of seed cotton bolls from seed cotton and more particularly to machines removing hulls from seed cotton by means of inclined cylinders or drums provided with hull extracting means, this invention being an improvement of the machine shown in my Patent No. 1,726,203, Aug. 27, 1929; and the object is to provide means, in addition to the means shown in said application, for taking care of the cotton which has heretofore been lost. In the hull separating machines, it has been discovered that the saws or pickers carry more cotton than the one brush will remove and consequently some of the cotton passes on with the hulls and is lost. This invention relates to means for taking care of the cotton which has heretofore been lost and this trouble is remedied by providing two discharge openings and two brushes so that the first brush will remove the most of the cotton from the picker roller and cause the same to be discharged through one chute or opening and the second brush will remove the remaining cotton from the picker roller and discharge the same through a second discharge opening which unites with the first opening or chutes. Heretofore in taking the cotton from the picker rollers the brushes had to be run at such high speed that the cotton fibre was damaged to a considerable extent. It has been found that by providing two brushes, the speed of the brushes can be reduced and made to run much slower so that the cotton fibre will not be injured. Another object is to provide means for retarding the passage of the mass of cotton and hulls along in the inclined roll box. Something was needed to retard the passage of the mass of cotton and hulls so that the roll box would remain intact and not be dissipated by so much of the cotton being removed by the picker roller and so many of the hulls falling through the longitudinal opening in the bottom of the roll box in the early operation of making the separation. This trouble is remedied by providing swinging baffle boards in the roll box. Other objects and advantages will be fully explained in the following description and the invention will be more particularly pointed out in the claims.

Reference is had to the accompanying drawings which form a part of this application.

Fig. 1 is a vertical section of the separating machine.

Fig. 2 is a detail view, illustrating further the baffle boards.

Similar characters of reference are used to indicate the same parts throughout the several views.

This machine is provided with a suitable frame or casing having a bottom 1, a front side 2, a rear side 3, and a top 4, and suitable side members 5. Frame members 6 and 7 are provided and constitute bearing members for the shafts 8 and 9 of the picker roller 10 and knocker roller 11 which shafts are journaled in bearings attached to the members 6 and 7. The machine is provided with a hopper or feeding device 12 which projects into an opening 13 in the top member 4. The mass of cotton and hulls is fed into the hopper 12 and drop into the roll box 14. The roll is similar to the usual roll formed in cotton gins and is formed by the action of the picker roller 10 and the doffing roller 11. An adjustable casing member 15 is hingedly connected to the front casing member 2. This adjustable member 15 together with the picker roller 10 forms a converging space towards the lower edge of the member 15, the lower edge being spaced sufficiently from the picker roller 10 to let the separated hulls fall out of the roll onto a conveyor 16 which carries the hulls out of the machine. Inclined boards 17 are provided to direct the hulls towards the conveyor 16. The adjustable casing member 15 is adjusted and held in the required position by rods 18 which are hingedly connected to a casing 15 and which projects through a bracket 19 and is held at the required adjustment by nuts 20 which are screwed on the rods 18. The picker roller takes the cotton from the roll box and leaves the hulls in the roll box to descend through the space between the lower edge of the casing member 15 and the picker roller. In order to prevent the hulls from passing on with the cotton, the doffing roller 11 is provided and driven in the direction indicated by the arrow head. This roller brushes back the hulls so that they will not follow the cotton, and causes the hulls to fall back downwardly in the roll box from which they escape as above set forth. A brush 21 is provided with a shaft 22 which is journaled in the machine casing and this brush 21 removes the greater portion of the cotton from the picker roller and the cotton is discharged through a chute or spout 23. But the brush 21 will not remove all of the cotton. Some of the cotton being carried past the brush 21. Provision is made for removal of the remaining cotton from the picker roller 10. A second brush 24 is provided with a shaft 25 which is journaled in the casing. This brush removes the remainder of the cotton from the picker roller and starts the cotton down a chute or discharge nozzle 26. All of the cotton is discharged through an opening 27 in the bottom of the casing.

The casing with the roll box is inclined slightly downwardly towards the end remote from the feed hopper 12. The mass of cotton and hulls forming the roll in the roll box 14 tends to shift towards the side of the machine which is indicated by the frame member 6 or lower side of the machine. The tendency of the cotton and hulls is to shift too fast and destroy the roll by making the roll incapable of supporting itself or clinging together to maintain the roll. The roll is also made thin or deleted by the picker removing the cotton and the hulls dropping out and on this account the roll is not self-supporting and some cotton would be carried out of the machine with the hulls. Means are provided for retarding the movement of the cotton and hulls towards the lower end. Baffle plates 28 are provided and are hingedly connected to boards or plates 29 which are stationary in the machine. The baffle plates 28 may swing as far as the dotted lines shown in Fig. 2. These plates 28 will retard the cotton and hulls so that the picker roller 10 will remove all the cotton from the hulls. The space 30 may be made as wide or as narrow as may be required for the passage of hulls through this longitudinal passage. This made possible by the adjusting devices 18 and 20 and by the hinges 31.

Either shaft 8 or shaft 25 may be driven and a chain belt 32 may be driven from the driven shaft to drive the picker roller 10, the two brushes 21 and 24, the doffing roller 11, and the conveyor 16. The tension of the chain belt may be obtained by the adjustable idler 33 over which the belt 32 runs.

What I claim, is,—

1. A hull extracting machine having a picker roller and upper and lower brushes cooperating with said roller for removing cotton from the teeth of the picker, and means for driving said picker roller and brushes.

2. A hull extracting machine having a picker roller for separating cotton from hulls, an upper revolving brush for removing the greater portion of cotton from the teeth of said picker roller, and a lower brush cooperating with said upper brush for removing the cotton not removed by said upper brush.

3. A hull extracting machine having a picker roller for separating cotton from hulls, upper and lower revolving brushes running at relatively slow speed for removing cotton from the teeth of said picker roller, and means for driving said picker roller and brush rollers.

4. A hull extracting machine having a picker roller for separating cotton from hulls, a doffing roller cooperating with said picker roller for preventing hulls from being carried with the cotton, upper and lower brushes cooperating with said picker roller for separating the cotton from the teeth of the picker roller, and means for driving said picker and doffing rollers and said brushes.

5. A hull extracting machine having a picker roller, upper and lower brushes cooperating with said picker for removing cotton from the teeth of the picker roller, separate discharge chutes for said brushes, and means for driving said picker roller and brushes.

6. A hull extracting machine having a picker roller and a roll box, a doffing roller for preventing hulls from following said picker roller and for throwing hulls back into said roll box, and upper and lower revolving brushes for removing cotton from the teeth of said picker roller.

In testimony whereof, I set my hand, this 25th day of October, 1928.

SAMUEL WILLIAMS.